June 7, 1932. B. B. BROWN 1,862,465
VALVE TOOL
Filed April 27, 1931 3 Sheets-Sheet 2
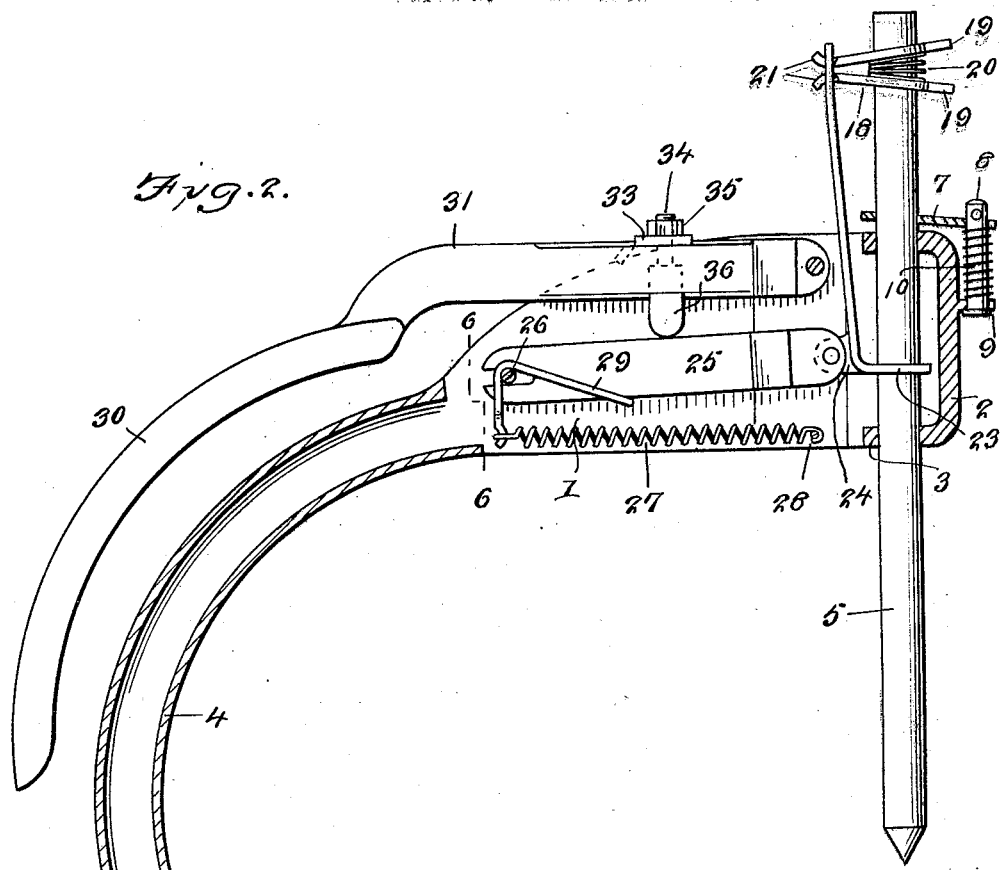
Fig. 2.
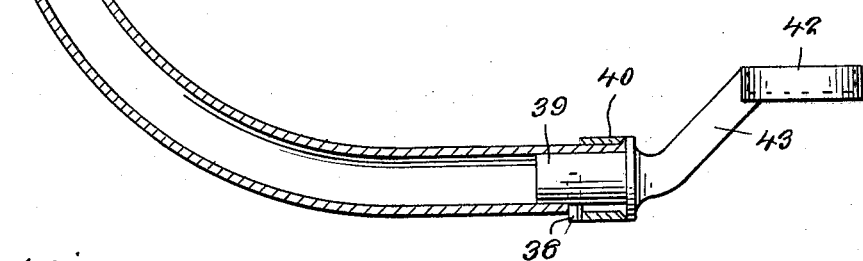
Fig. 10.
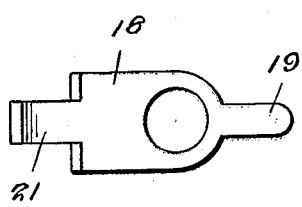
B. B. Brown
INVENTOR
BY Victor J. Evans
and Co. ATTORNEY June 7, 1932.   B. B. BROWN   1,862,465
VALVE TOOL
Filed April 27, 1931   3 Sheets-Sheet 3
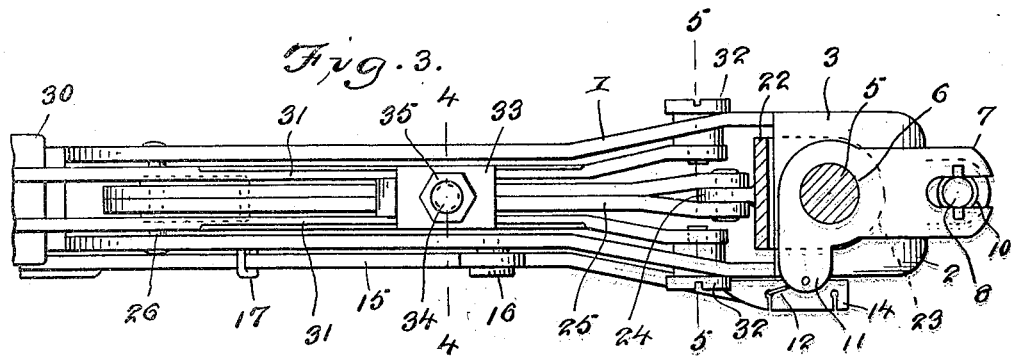
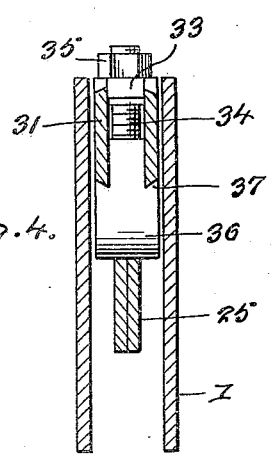
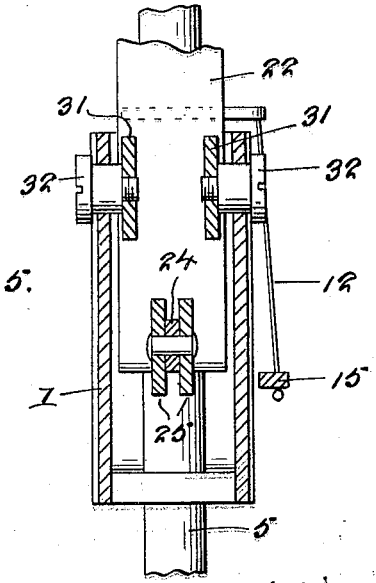
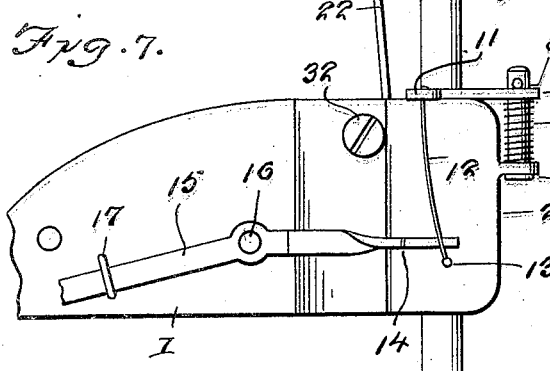
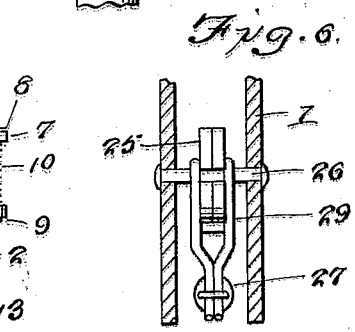
B. B. Brown
INVENTOR
BY Victor J. Evans
and Co. ATTORNEY Patented June 7, 1932

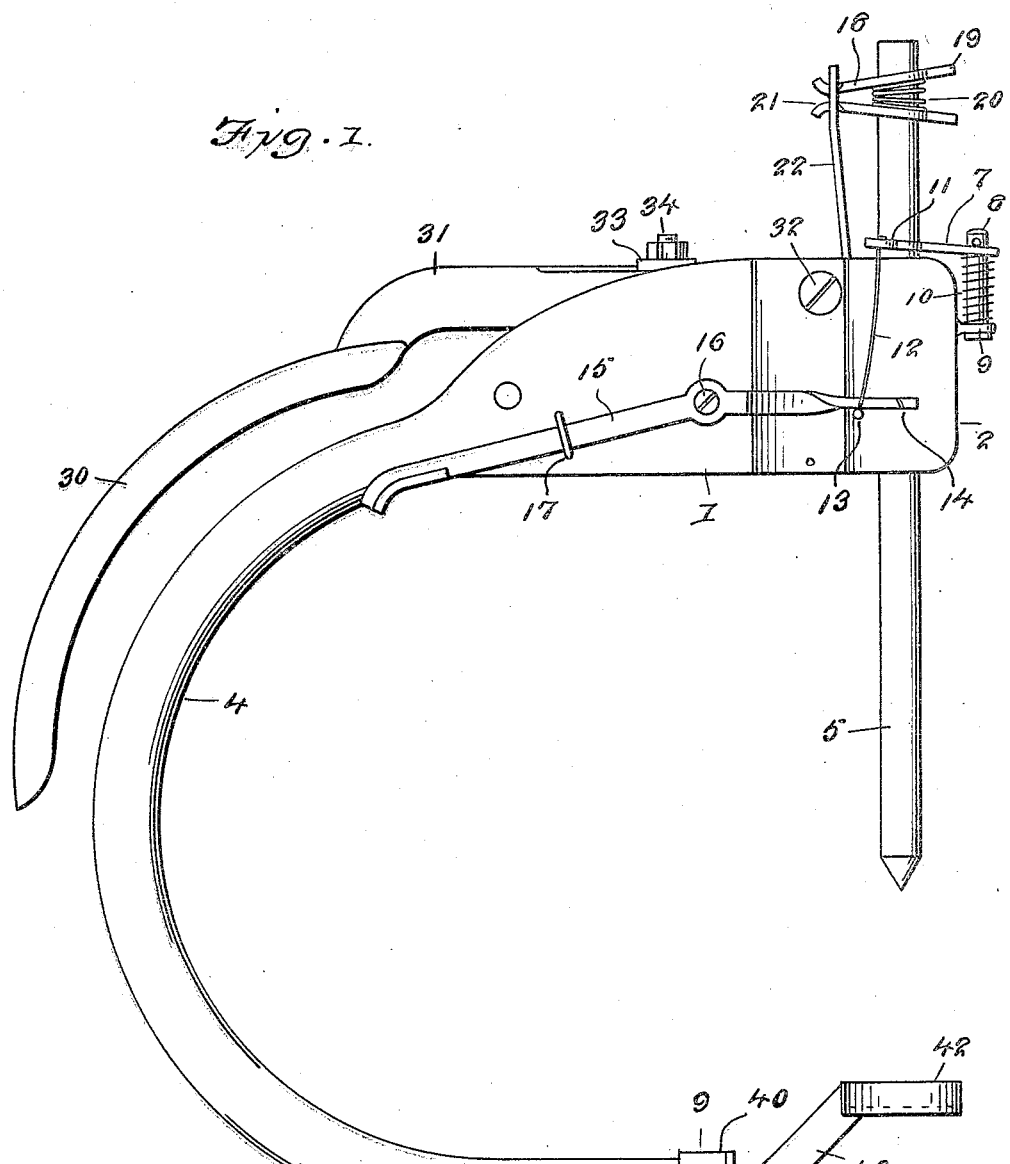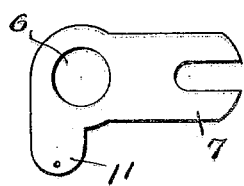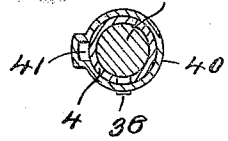

1,862,465

UNITED STATES PATENT OFFICE

BERT B. BROWN, OF THE DALLES, OREGON

VALVE TOOL

Application filed April 27, 1931. Serial No. 533,227.

This invention relates to valve tools and its general object is to provide a valve spring lifter or compressor that is not only easily and expeditiously operated and adjustable to compensate for various lengths of valve stems as well as for springs of various tensions, thus allowing for speed or power, but can be manipulated with one hand, with the result the other hand of the operator is free to handle valve locking devices, in a manner whereby the operator can hold his free hand under the valve spring to catch the devices when removing the springs, or to replace the devices on the stems during the assembling operation.

Another object of the invention is to provide a valve spring lifter or compressor that includes a detachable spring receiving means whereby said means may be interchangeable if it is so desired.

A still further object of the invention is to provide a valve spring lifter or compressor that is capable of being used on all types of motors with very little effort on the part of the operator, and is reasonably simple in construction, inexpensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In decribing my invention in detail, reference will be had to the accompanying drawings wherein like characters denote like or corresponding parts throughout the several views, and in which:

Figure 1 is a side elevation of the valve spring lifter or compressor which forms the subject matter of the present invention.

Figure 2 is a transverse sectional view taken through Figure 1, with parts in elevation.

Figure 3 is a fragmentary top plan view with parts in section.

Figure 4 is a sectional view taken approximately on line 4—4 of Figure 3.

Figure 5 is a sectional view taken approximately on line 5—5 of Figure 3.

Figure 6 is a sectional view taken approximately on line 6—6 of Figure 2.

Figure 7 is a fragmentary detail view illustrating the latching means for the valve head engaging spindle.

Figure 8 is a detail view of the latching plate.

Figure 9 is a sectional view taken approximately on line 9—9 of Figure 1.

Figure 10 is a top plan view of the spindle gripping means 18.

Referring to the drawings in detail, the reference numeral 1 indicates the body of my device which as best shown in Figure 2 includes a pair of parallel arranged plates having converging rear portions and a front portion 2, the latter having its upper and lower ends 3 bent in parallelism and formed integral with the plates. The rear portion of the plates of the body not only are disposed in converging relation with respect to each other but are reduced and merge into a curved handle portion 4 which is tubular and has its lower end terminating in alignment with the body as clearly shown in Figures 1 and 2.

The upper and lower ends 3 are each provided with openings arranged in alignment for the purpose of slidably receiving a rod 5 which is termed a spindle having a pointed lower end for the purpose of being received by the head of the valve in a manner which will be later described. The spindle is held in fixed relation with respect to the upper and lower ends 3 through the instrumentality of a suitable latching means which includes a plate having an opening 6 formed therein to receive the spindle and the latching plate is also formed with an ear 7 that is slotted for the purpose of accommodating the upper end of a pin 8, the latter passing through a lug 9 that extends from the front portion 2 and surrounding the pin 8 is a coil spring 10 which has its end convolutions engaging the lug 9 and ear 7 for holding the latching plate firmly against a cross pin which extends through the upper end of the pin 8 for the purpose of preventing lost motion of the latching plate between the top of the body of the device and the cross pin when the device is in use.

An extension 11 is also formed with the latching plate and has a minute opening provided adjacent the end thereof for the purpose of receiving a hair spring 12 which has its upper end secured in the minute opening, while its opposite end has fixed thereto a knob 13 whereby the spring can be manually moved for placing the same in either one of a pair of slots 14 arranged in spaced relation in one of the ends of a trigger 15 which is pivotally secured to a plate of the body through the instrumentality of a screw 16, and the opposite end of the trigger 15 is curved downwardly to provide a finger piece as will be apparent. The movement of the trigger is restricted by a keeper 17 which is secured to the last mentioned plate of the body as clearly shown in Figure 1. When the hair spring is disposed in the slot in a manner as shown in Figure 1, movement of the trigger will pull the latching plate downwardly to its releasing position, and when the hair spring is disposed in the other slot 14 the latching device is inoperative, as the opening in the latching plate is of a size to permit for the easy passage of the spindle therethrough as will be apparent.

The movement of the spindle vertically through the upper and lower ends 3 of the front portion of the body is accomplished through the instrumentality of a pair of rod or spindle gripping members 18 which are identical in size and shape and one of these members is shown in Figure 10.

It will be noted that the members 18 are provided with openings through which passes the spindle and these members are each provided with fingers 19 for operating the same against the tension of a coil spring 20 the latter being disposed between the members 18 and surrounding the spindle as shown in Figures 1 and 2. The members 18 are likewise provided with tongues 21 that are curved in opposed relation with respect to each other and received in an opening or slot formed in the upper end of a strip 22 that has its lower end bent substantially at right angles upon itself as at 23 and this lower end is provided with an opening through which passes the spindle as shown in Figure 2. Extending from the strip 22 at the juncture of its bent lower end therewith is a lug 24 which has pivotally secured thereto the inner ends of a pair of links 25 which are disposed in parallel relation to each other with their major portions arranged in contacting engagement. The opposite ends of the links 25 are slotted to receive a pin 26 which bridge the plates of the body as shown in Figure 2. The pin acts in the capacity as a pivot means for the links 25 which are held under tension through the instrumentality of a coil spring 27, the latter having one of its ends secured to a pin 28, while the opposite end of the coil spring 27 is secured to the hooked ends of a wire holder 29 that is disposed about the pin 26 and extends at an inclination to be arranged about and under the links 25.

While the links 25 operate the spindle through the medium of the strip 22, and the rod or spindle gripping members 18, this function is brought about by pressure upon the handle 30 of a manipulating member which includes spaced elongated members 31 formed with the handle 30 and these members 31 have their inner ends pivotally secured to screws 32 that extend through the side plates of the body as shown in Figure 3. The upper portions of the spaced elongated members 31 are grooved at opposed inclinations for a portion of their length for the purpose of receiving a block 33 that is provided with inclined portions formed to fit the grooves as best shown in Figure 4. The block 33 is in the form of a washer and is provided with an opening through which passes a threaded stud 34 that receives a nut 35, and the threaded stud 34 is formed with and rises from a cam member 36 which is provided with a rounded lower end engageable with the links 25 for moving the same on the pivot 26 as will be apparent. By this construction, it will be obvious that the cam member is adjustably associated with the links and this adjustment is accomplished by loosening the nut 35 and moving the cam members longitudinally of the spaced elongated members 31 to the position desired, and the nut is then tightened. By inclining the upper portions of the elongated members 31 and forming the block to fit the same, as well as recessing the cam member and forming the lower edges of the recess to accommodate the inclined lower portions 37 of the elongated members, the latter will not be spread apart when the nut is tightened, but will be held in true association with each other at all times.

The lower end of the curved handle portion is slotted longitudinally for a portion of its length for the purpose of accommodating a stud 38 formed with the shank 39 of the spring foot and surrounding the lower end is a collar 40 mounted for rotation thereon. The collar is provided with a channel 41 adapted to be aligned with the slot of the lower end of the curved handle portion. The shank is then placed in the curved handle portion until the stud 38 reaches the inner end of the slot thereof, and then the collar 40 can be rotated for disposing the channel 41 out of alignment with the slot or to the position as clearly shown in Figure 9, with the result the spring foot will be secured to the curved handle portion. The spring foot includes a cup 42 which is provided with a slot to receive the stem of a valve and of course the cup is adapted to receive the lower convolution of the valve spring. The shank has formed with its outer end a flange from which extends an arm 43, the latter having formed therewith the cup 42 which is arranged in alignment with the spindle as clearly shown in Figures 1 and 2. By detachably associating the spring foot with respect to the curved handle portion, the spring foot may be replaced by other foot pieces, in the event that it is desired to use the tool for purposes other than removing valves, as the tool can be used for compressing the springs when they are out of the engine to reinstall them and this is accomplished by replacing the spring foot as shown with a special narrow flat foot and a similar flat piece on the end of the spindle, which allows the spring to project on each side of the flat foot and piece.

From the above description and disclosure of the drawings it will be obvious that I have provided a valve spring lifter or compressor that is readily adjustable so as to vary the movement of the spindle 5 and this adjustment is accomplished in an easy and expeditious manner. The valve spring lifter and compressor can be manipulated by one hand of the operator, as pressure upon the handle 30 will cause the cam member to engage the links 25 and thereby move the spindle downwardly, due to the fact that the members 18 are arranged in gripping relation with the spindle 5, and the spindle can be locked in position by the latching plate which is controlled by the triger 15. Due to the fact that the device can be operated by one hand, the other hand of the operator is free to catch the valve locking device for replacing the latter in their proper positions.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A valve spring compressor comprising a body, a spindle mounted for slidable movement through said body and having a pointed lower end, a curved handle portion formed with said body and terminating in alignment therewith, a spring foot detachably associated with the curved handle portion and arranged in alignment with the spindle for co-operation therewith, a strip having a bent lower end arranged in said body, said curved lower end provided with an opening through which passes the spindle, means carried by the strip for gripping the spindle, said means being manually releasable, means for operating the strip for moving the spindle, said operating means being adjustable to vary the movement of the spindle, spring pressed latching means for the spindle, a trigger for operating the latching means, and means for holding the latching means in operative position.

2. A valve spring compressor comprising a body, a spindle mounted for slidable movement through said body, a curved handle portion formed with said body, spring receiving means detachably associated with said curved handle means and arranged in alignment with the spindle, a strip having a bent lower end provided with an opening to slidably receive the spindle, spring pressed links pivotally secured to said strip, spaced elongated members pivotally mounted in said body, a handle formed with said spaced elongated members, cam means adjustably secured to said spaced elongated members and engageable with the links for moving the latter, gripping means for the spindle and carried by the strip and said gripping means being manually releasable and adapted to move the spindle upon movement of the handle of the elongated members.

3. A valve spring compressor comprising a body, a curved handle portion formed with said body, spring receiving means detachably associated with said curved handle portion, a spindle mounted for slidable movement through said body and arranged in alignment with the spring receiving means, a strip having a bent lower end provided with an opening for slidably receiving the spindle, gripping means for said spindle and carried by the strip, fingers included in the gripping means for manually operating the same, a coil spring for holding the gripping means in operative position, links pivotally secured with respect to the strip and having one of their ends slotted, a pin passing through the body and received in the slots for pivotally mounting the latter, spring means for said links, elongated members pivotally mounted in said body, a handle for said elongated members and being arranged to follow the curvature of the curved handle portion, a cam member mounted for slidable movement with respect to the elongated members, means for securing the cam member in fixed position, said cam member being engageable with the links to vary the movement thereof on their pivot whereby to vary the movement of the spindle, latching means for the spindle to hold the latter fixed, a latching plate included in the latching means and including an opening through which passes the spindle, a trigger mounted for pivotal movement on the body and being provided with spaced slots, a hair spring secured to the latching plate and being adapted to be received in either of the slots for controlling the operation of the latching means.

In testimony whereof I affix my signature.

BERT B. BROWN.